United States Patent [19]

Strohschein

[11] 3,893,726
[45] July 8, 1975

[54] SHOCK ABSORBER VEHICLE BUMPER

[75] Inventor: Clayton B. Strohschein, Channelview, Tex.

[73] Assignee: The Raymond Lee Organization, Inc., New York, N.Y. ; a part interest

[22] Filed: Apr. 1, 1974

[21] Appl. No.: 456,749

[52] U.S. Cl. .................. 293/1; 180/108; 188/1 C; 293/9; 293/63; 293/73; 293/89
[51] Int. Cl. ............................................. B60r 19/04
[58] Field of Search ............... 293/1, 2, 4, 5, 9, 10, 293/24–26, 70, 73, 89, 63; 188/1 C; 180/91, 103, 105 R, 105 E, 108

[56] References Cited
UNITED STATES PATENTS

| | | | |
|---|---|---|---|
| 2,134,108 | 10/1938 | Drude | 293/26 |
| 2,847,964 | 8/1958 | Skinas | 293/26 X |
| 2,961,204 | 11/1960 | Rayfield et al. | 188/1 C X |
| 3,346,292 | 10/1967 | Lundman | 293/9 |
| 3,355,208 | 11/1967 | Brock | 293/9 |
| 3,653,468 | 4/1972 | Marshall | 188/1 C |
| 3,677,595 | 7/1972 | Hamilton | 293/9 X |
| 3,729,221 | 4/1973 | Granig | 293/9 |
| 3,751,089 | 8/1973 | Lefeuvre | 293/1 |
| 3,779,591 | 12/1973 | Rands | 293/1 X |
| 3,782,505 | 1/1974 | Armstrong | 293/70 X |

FOREIGN PATENTS OR APPLICATIONS

| | | | |
|---|---|---|---|
| 1,093,233 | 11/1960 | Germany | 180/91 |
| 905,836 | 9/1962 | United Kingdom | 188/1 C |

*Primary Examiner*—M. Henson Wood, Jr.
*Assistant Examiner*—Andres Kashnikow
*Attorney, Agent, or Firm*—Howard I. Podell

[57] ABSTRACT

A vehicle bumper mechanism for the absorbing of the shock of a collision, which is suitable for use as both a front and a rear vehicle bumper. The bumper may be automatically extended away from the vehicle just prior to collision, and the collision force against the bumper forces the bumper support members against knives which shear a portion of the bumper support member, on the protected vehicle. The bumper support member may be in the form of a laminated structure with lamina materials of varying resistance, and the shear knives may be set so as to shear one or more of the laminations depending on the rate of deceleration caused by the collision.

1 Claim, 8 Drawing Figures

3,893,726

SHOCK ABSORBER VEHICLE BUMPER

SUMMARY OF THE INVENTION

This invention relates to an automobile bumper and support structure which absorbs a portion of energy of collision. An advantage of this invention is that the bumper mechanism reduces the collision and impact forces on a vehicle to safer levels that may be sustained by the occupants. A further advantage of the invention is that the mechanism may absorb energy at a rate proportional to the deceleration rate of the collision.

My invention consists of an automobile bumper, mounted on support members, which may be utilized as the front or the rear bumper of vehicle. Bumpers are mounted onto support members which telescope into the chassis members of the mounted vehicle. In response to rapid deceleration just prior to a collision, the bumper support members are extended away from the vehicle by hydraulic or mechanical means such as a gear motor. The force of collision drives the bumpers and attached support member as a bumper support member is forced back into telescopic engagement with the chassis members of the vehicle, with the shear forces acting to substantially reduce the collision force upon the vehicle body and its occupants. The bumper support member may be formed of a laminated structure, and the shear knives set so that on impact the knife mechanisms set so as to bend the sheared lamination. The shear knife mechanism may be set to shear a variable thickness or a varied number of laminations, with the thickness of the sheared material being proportional to the rate of deceleration caused by the collision.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
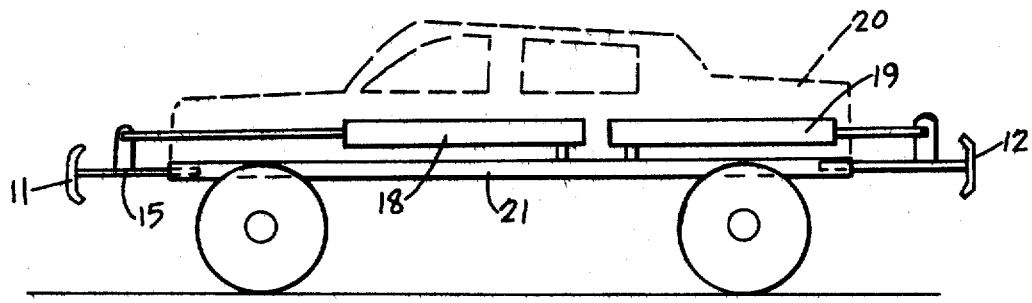
FIG. 1 is a side view of vehicle equipped with extendable bumpers of the invention.
Figure 4:
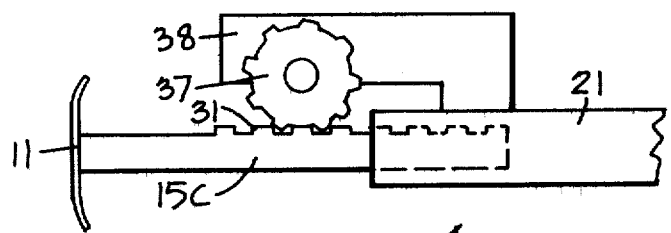
FIG. 4 is a side view of the bumper support member illustrating an alternate means of extending the bumper by means of a gear motor.

Turning now descriptively to the drawings, in which similar reference characters denote similar elements throughout the several views, FIG. 1 illustrates a vehicle 20 equipped with front bumper 11 and rear bumper 12 that are each mounted on bumper support members 15 and 16 respectively. The bumper support members 15 and 16 are telescopically engaged with the chassis longitudinal member 21 so that the bumper support members 15 and 16 may slide longitudinally in engagement with chassis longitudinal member 21. The pistons of hydraulic cylinders 18 and 19 are joined to the bumper support members 15 and 16 respectively with hydraulic cylinders 18 and 19 being fastened to the chassis 21. Immediately prior to a collision, and in response to a sudden deceleration of the vehicle, the hydraulic cylinders 18 and 19 act to extend bumpers 11 and 12 longitudinally away from the vehicle. Alternately as shown in FIG. 4 the bumpers 11 and 12 may be extended away from the vehicle by means of a gear motor 38 which rotates a gear 37 in engagement with rack 31 on the bumper support member 15C.

Figure 2:
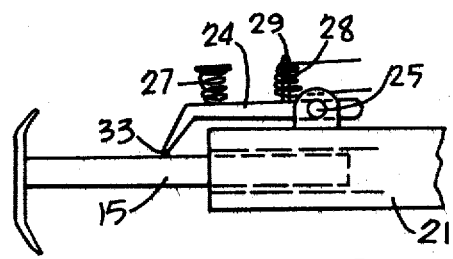
FIG. 2 is a detail side view of the telescopic joint of a bumper support member with vehicle chassis.
Figure 3:
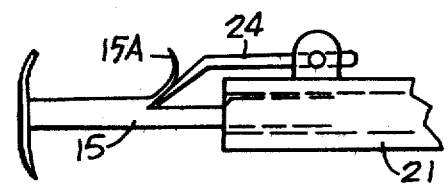
FIG. 3 is a side view similar to that of FIG. 2, with the shear knife in the operating position.

As shown in FIG. 2, a shear knife is mounted to the chassis member 21 by means of a pin 25. The shear knife 24 is held by a tension spring 27 so as to be free of engagement with bumper support member 15, except immediately prior, and during a collision. Electrical decelerations sensing equipment, (not shown) control the electric current to a solenoid 28 causing solenoid armature 29 to force the tip 33 of shear knife 24 into engagement with a bumper support member 15 immediately prior to a collision so that, as shown in FIG. 3 the shear knife 24 shears a section 15A of the support member 15 as the bumper support member 15 is driven back towards the vehicle, with the force of the shearing action and of the bending action of the laminated strip 15A of the bumper support member absorbing energy of collision.

Figure 5A:
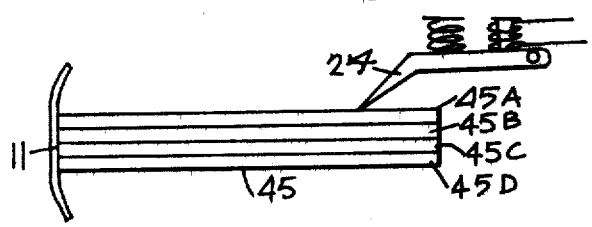
FIG. 5A is a side view of an alternate embodiment of the bumper support member which is made of laminated sections.
Figure 5B:
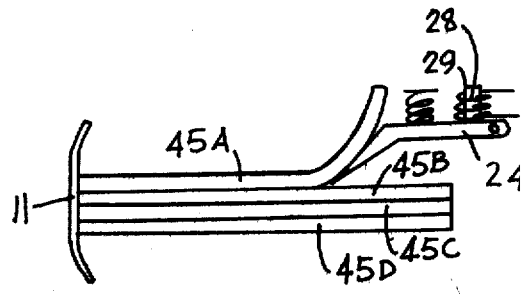
FIG. 5B is a side view similar to FIG. 5A, with the shear knife in the operating position during a minor collision.
Figure 5C:
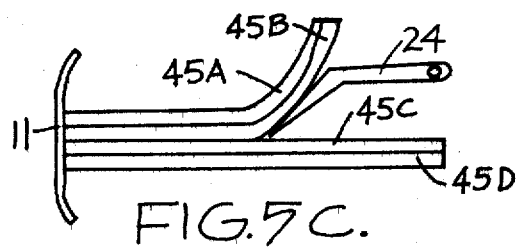
FIG. 5C is a view similar to FIG. 5B with the shear knife in the operating position during a collision of medium impact force.
Figure 5D:
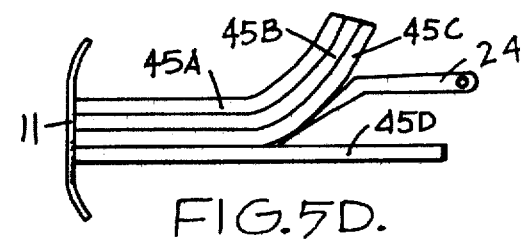
FIG. 5D is a side view similar to FIG. 5B with the shear knife in the operating position for a collision of major impact force.

As shown in FIG. 5A, FIG. 5B and FIG. 5C, the bumper support member 45 may be formed of laminated sections 45A, 45B, 45C and 45D. The sensing equipment may position the shear knife 24 so as to shear only the outward-most laminate layer 45A from the composite support member 45 in a collision of minor impact force. The sensing associated equipment forces the armature 29 of the solenoid 28 to drive shear knife 24 deeper so as to shear two laminates 45A and 45B in a collision of moderate impact force such as shown in 45C. A collision of major impact force would result in the shear knife 24 shearing three laminates 45A, 45B and 45C from the composite bumper support member 45 plus the bending forces in bending the laminated sections about the shear knife would absorb considerable energy of vehicle collision.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A vehicle bumper mechanism for the reduction of collision forces on a protected vehicle to which the bumper mechanism is mounted, comprising a vehicle bumper mounted on a support member, said support member being in longitudinal telescopic engagement with a chassis support member of the attached vehicle, said bumper support member fitted with means for extending the bumper away from the attached vehicle, prior to a collision, together with shear knife means fitted on the chassis support member for shearing a lamina of the bumper support member when the bumper support member is driven back abruptly towards the chassis support member by the impact of a collision, in which the shear knife means positions the shear knife to shear a variable thickness of bumper support member, with the thickkness of the sheared lamina being proportional to the rate of deceleration of the attached vehicle.

* * * * *